US012675570B2

(12) United States Patent
Mankin et al.

(10) Patent No.: US 12,675,570 B2
(45) Date of Patent: Jul. 7, 2026

(54) TRIGGERING AND DOWNSELECTION OF VOLATILE MEMORY SCANNING

(71) Applicant: CrowdStrike, Inc., Sunnyvale, CA (US)

(72) Inventors: Jennifer Mankin, San Jose, CA (US); Blair Foster, Ottawa (CA); Marc Leclair, Ottawa (CA); Eric Kuhl, Halethorpe, MD (US)

(73) Assignee: CrowdStrike, Inc., Sunnyvale, CA (US)

( * ) Notice: Subject to any disclaimer, the term of this patent is extended or adjusted under 35 U.S.C. 154(b) by 172 days.

(21) Appl. No.: 18/448,636

(22) Filed: Aug. 11, 2023

(65) Prior Publication Data

US 2024/0296223 A1      Sep. 5, 2024

Related U.S. Application Data

(60) Provisional application No. 63/449,883, filed on Mar. 3, 2023.

(51) Int. Cl.
G06F 21/56 (2013.01)
G06F 21/55 (2013.01)
(52) U.S. Cl.
CPC .......... G06F 21/564 (2013.01); G06F 21/552 (2013.01)
(58) Field of Classification Search
None
See application file for complete search history.

(56) References Cited

U.S. PATENT DOCUMENTS

| | | | | |
|---|---|---|---|---|
| 8,613,091 B1 * | 12/2013 | Vaidya | .................. | G06F 21/566 |
| | | | | 711/163 |
| 11,861,007 B1 * | 1/2024 | Ciubotariu | .......... | G06F 9/45558 |
| 2003/0115479 A1 * | 6/2003 | Edwards | .............. | G06F 21/564 |
| | | | | 726/22 |
| 2003/0145228 A1 * | 7/2003 | Suuronen | ............ | H04L 63/1408 |
| | | | | 726/12 |

(Continued)

FOREIGN PATENT DOCUMENTS

WO      WO2019113843 A1      6/2019

OTHER PUBLICATIONS

Botacin et al., "Near Memory & In-Memory Detection of Fileless Malware," in the proceedings of The International Symposium on Memory Systems (MEMSYS), Sep. 28, 2020, pp. 23-38.

(Continued)

*Primary Examiner* — Kaveh Abrishamkar
(74) *Attorney, Agent, or Firm* — Lee & Hayes, P.C.

(57)      ABSTRACT

Methods and systems implement computing systems configured to trigger a volatile memory scan based on execution of computer-executable instructions, and to downselect scope of a volatile memory scan. Such techniques for triggering scans are sufficiently selective to avoid volatile memory scans for each and every running process, or vast majority of running processes. Moreover, volatile memory scans are triggered responsively after the computer-executable instructions are run, so that target processes to be scanned have not yet terminated at the time of the volatile memory scan. Additionally, a variety of techniques are implemented to minimize the volatile memory scans adversely impacting computational performance of the computing system.

20 Claims, 6 Drawing Sheets

(56)                    References Cited

U.S. PATENT DOCUMENTS

| | | | | |
|---|---|---|---|---|
| 2005/0055558 A1* | 3/2005 | Carmona | .............. | G06F 21/568 |
| | | | | 713/188 |
| 2009/0222923 A1* | 9/2009 | Dixon | ................... | G06F 21/563 |
| | | | | 711/E12.001 |
| 2010/0057478 A1* | 3/2010 | Hamilton, II | ........ | G06Q 10/087 |
| | | | | 709/224 |
| 2011/0314547 A1* | 12/2011 | Yoo | ......................... | G06F 21/56 |
| | | | | 726/24 |
| 2014/0283058 A1* | 9/2014 | Gupta | ................... | G06F 21/562 |
| | | | | 726/23 |
| 2015/0227742 A1* | 8/2015 | Pereira | ................. | G06F 21/566 |
| | | | | 726/24 |
| 2016/0117497 A1* | 4/2016 | Saxena | ................. | G06F 21/566 |
| | | | | 726/26 |
| 2016/0117498 A1* | 4/2016 | Saxena | ................. | G06F 21/445 |
| | | | | 726/26 |
| 2016/0283717 A1* | 9/2016 | LeMay | ............... | G06F 12/0802 |
| 2019/0102552 A1* | 4/2019 | Pavlyushchik | ....... | G06F 21/566 |
| 2021/0232677 A1* | 7/2021 | Pedasingu | ............. | G06F 21/566 |

OTHER PUBLICATIONS

European Search Report for related European Patent Application
No. 24160734.0, dated Jul. 29, 2024, 8 pages.

\* cited by examiner

FIG. 3B

```
{
  "Id": 0,
  "Pattern": [0x01, 0xab, 0xcc, 0x12, 0x34, 0xdf, 0x77, 0x5a, 0x70, 0x5c, 0x64],
  "MemoryType": ["MEM_PRIVATE"],
  "MemoryPermissions": ["PAGE_EXECUTE_READ", "PAGE_EXECUTE_READWRITE"]
},
{
  "Id": 1,
  "Pattern": "MaliciousString",
  "MemoryType": ["MEM_IMAGE"]
  "MemoryPermissions": ["PAGE_EXECUTE_READ"]
},
{
  "Id": 1,
  "Pattern": "Malicious.*[S,s]tring",
  "MemoryType": ["MEM_IMAGE"]
  "MemoryPermissions": ["PAGE_EXECUTE_READ"]
},
```

FIG. 4

TRIGGERING AND DOWNSELECTION OF VOLATILE MEMORY SCANNING

RELATED APPLICATIONS

This application claims the benefit of U.S. Provisional Patent Application No. 63/449,883, entitled "TRIGGERING AND DOWNSELECTION OF VOLATILE MEMORY SCANNING" and filed Mar. 3, 2023, which is expressly incorporated herein by reference in its entirety.

BACKGROUND

In cybersecurity, the design of malicious cyberattacks continues to evolve in adversarial fashions to evade malware detection techniques. By way of example, in response to the preponderance of techniques of scanning and quarantining executable files, cyberattacks can now be executed "filelessly," in whole or in part, causing computer-executable instructions to be written directly to volatile memory of a computing system, where they are directly executed by a processor of the computing system, or causing computer-executable instructions to be executed to load or manipulate data directly in volatile memory. Established techniques for scanning executable files stored on non-volatile storage do not necessarily configure a computing system to also scan volatile memory, and scanning of files and data persistent storage cannot detect such attacks as described above.

Fileless malware cyberattacks are suited to evade conventional cybersecurity techniques not only because they are not executed from non-volatile storage. Furthermore, fileless malware can evade detection altogether because they need not necessarily leave any footprint on a computing system after execution; in the event that the attack does not alter any files stored on non-volatile storage, no patterns may be left behind on storage of a computing system for established techniques for scanning executable files to detect.

Modern computing systems commonly include volatile memory providing gigabytes of data storage. Memory scanning techniques have been proposed to detect fileless malware by configuring computing systems to scan the entirety of volatile memory storage on a computing system, searching for patterns which match known malware. However, such scanning techniques can be impractical due to the size of data stored in volatile memory storage, as well as due to the fact that computer-executable instructions may be written to volatile memory only for ephemeral durations of time.

There is a need to improve scanning techniques for detecting malware attacks within volatile memory of computing systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A, 3B, and 3C illustrate a flow diagram of a volatile memory scanning process according to example embodiments of the present disclosure.

FIG. 4 illustrates a configuration file storing multiple definitions according to example embodiments of the present disclosure. FIG. 4 illustrates a configuration file storing multiple definitions according to example embodiments of the present disclosure.

DETAILED DESCRIPTION

Apparatuses and methods discussed herein are directed to implementing volatile memory scanning, and more specifically configuring a computing system to trigger a volatile memory scan based on execution of computer-executable instructions, and to downselect scope of a volatile memory scan.

Endpoint detection and response ("EDR") techniques in cybersecurity detect cyberattacks by analyzing executable files on non-volatile storage. However, "fileless" cyberattacks are executed at least in part from instructions loaded into volatile memory, bypassing non-volatile storage and evading EDR detection. Memory scanning techniques can potentially detect fileless cyberattacks by scanning volatile memory, but such scanning cannot be performed at high frequency, as frequent scans of volatile memory would severely degrade computational performance.

Therefore, example embodiments of the present disclosure provide volatile memory scanning selectively triggered by particular sequences of computational events, and can optionally further downselect scope of memory scans based on memory type and memory permissions, avoiding incurring computational performance penalties from volatile memory scanning.

Figure 1:
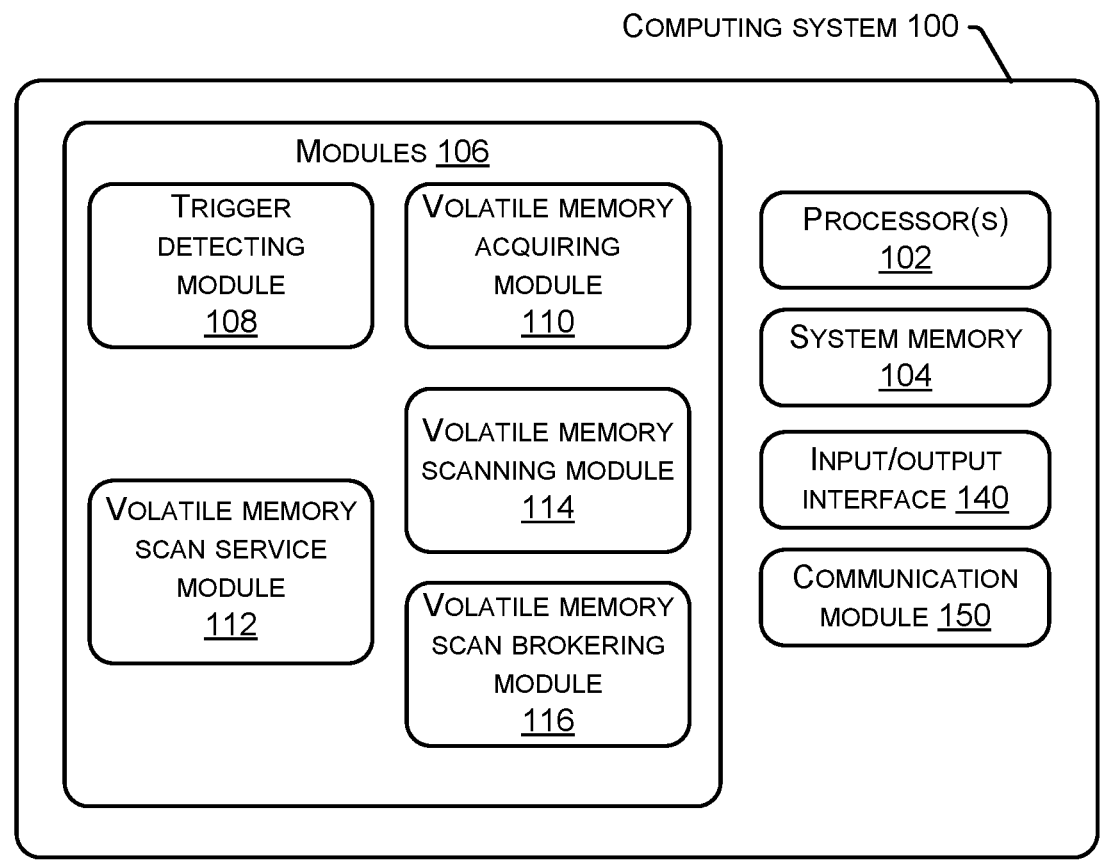
FIG. 1 illustrates an example computing system for implementing the processes and methods described herein for implementing volatile memory scanning.

FIG. 1 illustrates an example computing system 100 for implementing the processes and methods described herein for implementing volatile memory scanning.

The techniques and mechanisms described herein may be implemented by multiple instances of the computing system 100, as well as by any other computing device, system, and/or environment. The computing system 100 shown in FIG. 1 is only one example of a computing system and is not intended to suggest any limitation as to the scope of use or functionality of any system configured to perform the processes and/or procedures described herein. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing system 100 may include one or more processors 102 and system memory 104 communicatively coupled to the one or more processors 102. The one or more processors 102 may execute one or more modules and/or processes to cause the one or more processors 102 to perform a variety of functions. In embodiments, the one or more processors 102 may include one or more general-purpose processors and one or more special-purpose processors. The one or more general-purpose processors and one or more special-purpose processors may execute one or more instructions stored on a computer-readable storage medium as described below to cause the one or more general-purpose processors or one or more special-purpose processors to perform a variety of functions. General-purpose processors may be computing devices operative to execute computer-executable instructions, such as Central Processing Units ("CPUs"). Special-purpose processors may be computing devices having hardware or software elements facilitating computation of tasks such as matrix multiplication, by implementing engines operative to compute mathematical operations such as matrix operations and vector operations. For example, special-purpose processors may be accelerators, such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. Additionally, each of the one or more processors 102 may possess its own local memory, which also may store program modules, program data, and/or one or more operating systems.

Depending on the exact configuration and type of the computing system 100, the system memory 104 may include at least volatile memory, such as random-access memory ("RAM"), as well as non-volatile memory, such as read-only memory ("ROM"), flash memory, miniature hard drive, memory card, and the like, or some combination thereof. The system memory 104 may include one or more computer-executable modules 106 that are executable by the one or more processors 102.

The modules 106 may include, but are not limited to, a trigger detecting module 108, a volatile memory acquiring module 110, a volatile memory scan service module 112, a volatile memory scanning module 114, and a volatile memory scan brokering module 116.

The trigger detecting module 108 is executable by the one or more processors 102 to cause the one or more processors 102 to detect a volatile memory scan trigger as subsequently described.

The volatile memory acquiring module 110 is executable by the one or more processors 102 to cause the one or more processors 102 to acquire data stored in volatile memory as subsequently described.

The volatile memory scan service module 112 is executable by the one or more processors 102 to cause the one or more processors 102 to schedule a volatile memory scan as subsequently described.

The volatile memory scanning module 114 is executable by the one or more processors 102 to cause the one or more processors 102 to perform a volatile memory scan as subsequently described.

The volatile memory scan brokering module 116 is executable by the one or more processors 102 to cause the one or more processors 102 to exchange data between the volatile memory scan service module 112 and the volatile memory scanning module 114 as subsequently described.

The computing system 100 may additionally include an input/output (I/O) interface 140 and a communication module 150 allowing the computing system 100 to communicate with other systems and devices over a network, such as the data processing platform, a computing device of a data owner, and a computing device of a data collector. The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

Figure 2:
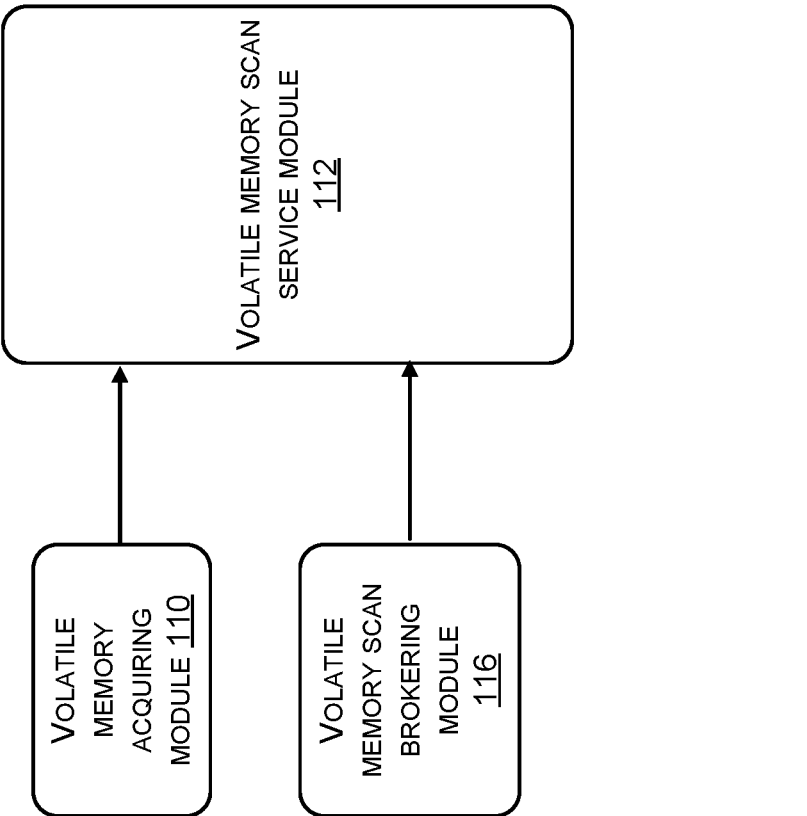
FIG. 2 illustrates a block diagram of the exchange of data between a volatile memory acquiring module, a volatile memory scanning module, and a volatile memory scan brokering module.

The computer-readable instructions stored on one or more non-transitory computer-readable storage media that, when executed by one or more processors, may perform operations described herein with reference to FIGS. 2-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

According to example embodiments of the present disclosure, some of the above-mentioned modules can be kernel-level modules, while others of the above-mentioned modules can include one or more kernel-level submodules. Kernel-level modules and submodules include computer-executable instructions configured to be executed by one or more processors 102 of a computing system 100 by loading at least part of the computer-executable instructions into kernel space of system memory 104 of the computing system 100, wherein calls to system services provided by an operating system ("OS") running on the computing system 100 may be executed.

By calls to OS system services, modules and submodules can configure one or more processors 102 of a computing system 100 to determine execution of other computer-executable instructions being executed by any one or more processors 102 of a computing system 100. Any number of modules and submodules can determine execution of other computer-executable instructions in this fashion.

In such manners, modules and submodule components of modules as described herein may receive notifications of execution of other computer-executable instructions (such as writes to volatile memory, executables files being launched, or flow of network traffic to remote network addresses) from host operating system hooks or filter drivers, from user-mode activity pattern monitors, or from threads monitoring log files or memory locations.

Moreover, for the purpose of understanding example embodiments of the present disclosure, it should be understood that software packages encompassing computer-executable instructions implementing security agents can be installed at a computing system 100. Security agents can include further kernel-level processes which execute in kernel space, configuring one or more processors 102 to monitor computational activity at the computing system 100. Kernel-level processes of security agents can further configure one or more processors 102 to communicate with remote hosts over one or more network connections; over one or more network connections, the computing system 100 can receive software packages, package updates, configurations, configuration updates, remote commands, and the like, from remote hosts.

Kernel-level processes of security agents can further enact security remedial processes at the computing system 100 based on commands received over one or more network connections from a remote host. A human operator such as a network administrator or security analyst can review, at a remote host, scan results generated at a computing system 100, and can determine therefrom that security remedial processes should be performed at the computing system 100 to remedy malicious cyberattacks occurring at the computing system 100. Such techniques can be implemented in accordance with endpoint detection and response ("EDR") technology.

A trigger detecting module 108, as described above, can be a kernel-level process or a user-level process of a security agent. The trigger detecting module 108 can configure one or more processors 102 of a computing system 100 to detect any among various volatile memory scan triggers by any component of the computing system 100. Thus, a security agent can monitor execution of other computer-executable instructions at a computing system 100, and can cause the computing system 100 to perform volatile memory scans as configured by a volatile memory acquiring module 110, a volatile memory scan service module 112, and a volatile memory scanning module 114.

According to example embodiments of the present disclosure, one or more processors 102 can run computer-executable instructions of the trigger detecting module 108 in one or more threads. A processor having multiple cores may execute multiple such threads concurrently, so computer-executable instructions of the trigger detecting module 108 can run concurrent to other processes, so as to configure one or more processors 102 to detect execution of other computer-executable instructions by calling OS system services as described above.

According to example embodiments of the present disclosure, the trigger detecting module 108 configures the computing system 100 to perform a volatile memory scan upon the detection of a scan trigger, where one or more processors 102 of the computing system 100 are configured to perform a volatile memory scan by a volatile memory acquiring module 110, a volatile memory scan service module 112, and a volatile memory scanning module 114 as shall be described in further detail. Since fileless malware attacks can be conducted without malicious executable files stored on non-volatile memory, a volatile memory scan according to example embodiments of the present disclosure seeks to detect a fileless malware attack while it is being executed by one or more processors 102 of a computing system 100 in volatile memory.

However, it is impractical to scan the entire volatile memory of a computing system or a process executing on the computing system, since computational performance of a computing system is commonly bottlenecked by availability of volatile memory and CPU utilization of CPU-intensive workloads across large swathes of memory, and a complete scan of volatile memory would tend to further reduce availability of volatile memory and CPU utilization to be allocated to other tasks executing on the computing system. Therefore, volatile memory cannot be scanned with high frequency, as such scans would prevent a computing system from performing other computations. Even if volatile memory scans were performed upon execution of processes, scanning memory upon, or during, execution of each and every running process can also similarly bottleneck computational performance.

Furthermore, if frequency of scanning were reduced to such an extent that computational performance impacts were tolerable, the likelihood of detecting a fileless malware attack by periodic full scans of volatile memory is considerably low; scans based on arbitrary timers are more likely to occur before malicious computer-executable instructions are in memory, or after the attack has been successfully executed. Additionally, fileless malware attacks can include self-encryption of computer-executable instructions while in memory for obfuscation purposes, further reducing the time window available for volatile memory scans to detect such attacks.

Consequently, according to example embodiments of the present disclosure, each scan trigger includes multiple parameters, the multiple parameters describing at least a sequence of triggering events. As defined herein, a sequence of triggering events includes multiple computational events which one or more processors 102 can perform, including at least loading computer-executable instructions into addresses of volatile memory, and running the computer-executable instructions. A sequence of triggering events can include other volatile memory accesses such as, by way of example, loading data in addresses of volatile memory and modifying data at addresses of volatile memory. Such sequences of triggering events do not occur so frequently on a computing system 100 that volatile memory scans would be triggered by each and every running process, or based on the vast majority of running processes. Moreover, such sequences of triggering events can trigger a volatile memory scan responsively after the computer-executable instructions are run, so that target processes to be scanned have not yet terminated at the time of the volatile memory scan.

By way of example, and without limitation thereto, computational events which can make up a sequence of triggering events, including examples of loading computer-executable instructions into addresses of volatile memory, loading data in addresses of volatile memory, and modifying data at addresses of volatile memory, are described below.

Execution of any computer-executable instructions may cause the computing system 100 to allocate memory addresses of volatile memory; to set both write permission and execute permissions of memory addresses of allocated volatile memory; to write computer-executable instructions to memory addresses of the volatile memory; to execute computer-executable instructions from volatile memory in a process; to load data in addresses of volatile memory allocated to the process; and to modify data at addresses of volatile memory allocated to the process.

Execution of any computer-executable instructions may cause the computing system 100 to open a network connection to a remote network address, such as an URL; to send a request according to a networking protocol to a remote network address, such as an HTTP request; to receive a file transfer according to a networking protocol from a remote network address; to allocate memory addresses of volatile memory; to set both write permission and execute permissions of memory addresses of allocated volatile memory; to write computer-executable instructions to memory addresses of the volatile memory; to execute computer-executable instructions from volatile memory in a process; to load data in addresses of volatile memory allocated to the process; and to modify data at addresses of volatile memory allocated to the process.

Execution of any computer-executable instructions may cause the computing system 100 to load one or more sets of computer-executable instructions from non-volatile memory into addresses of volatile memory; to execute computer-executable instructions from volatile memory in a process; to load data in addresses of volatile memory allocated to the process; and to modify data at addresses of volatile memory allocated to the process. One or more sets of computer-executable instructions can be loaded from a script stored on non-volatile memory; an unsigned executable file stored on non-volatile memory; a dynamically linked library stored on non-volatile memory; and the like. A dynamically-linked library can provide functions, routines, objects, variables, and other source code which may be called in computer-executable instructions, the calls being resolved by a compiler during compilation of source code, and copied into target source code to create linked object code which may be executed by one or more processors 102 as part of computer-executable target object code.

As illustrated by the above examples, sequences of triggering events according to example embodiments of the present disclosure can lead to malicious attacks in the event that malicious computer-executable instructions are loaded into volatile memory addresses, and are then executed from volatile memory in a process, or in the event that malicious computer-executable instructions directly manipulate volatile memory. In the course of normal operation of a computing system, most computer-executable instructions in volatile memory will not be malicious, and most computer-executable instructions executed from volatile memory will not be malicious.

However, in the event that allocation, setting of permissions, loading, and execution events as described above each follow in close succession, the likelihood of a malicious attack is increased. Furthermore, by way of example and without limitation thereto, in the event that the loaded computer-executable instructions originate from a remote network address, originate from a script, originate from an unsigned executable file, or from a dynamically-linked library, as well as other examples wherein the loaded computer-executable instructions originate from non-local or non-trusted sources, the likelihood of a malicious attack is increased. Therefore, triggering a volatile memory scan following the last event in such a sequence of triggering events (e.g., the execution of computer-executable instructions from volatile memory in a process) increases the likelihood of detecting a malicious attack based on the volatile memory scan.

Furthermore, the above-described process in which these instructions are executed during the sequence of triggering events can be specifically targeted by the volatile memory scan as a "target process." The target process can be run in a new thread launched during the triggering events, or can be run in an existing thread. By referencing an identifier of the target process and a virtual address space allocated to the target process, one or more processors can be configured to scan only memory addresses containing data of the target process, as shall be described in further detail subsequently. One or more processors are further configured to scan those memory addresses while the target process is running, before it has terminated, this increases the likelihood of detecting byte sequences, string sequences, and/or patterns of characters matching a regular expression ("regex") indicating a malicious attack.

Moreover, one or more processors 102 can determine a target process by matching some combination of text strings and/or regex patterns are present in the process, and/or text strings and/or regex patterns that are not present in the process. Moreover, one or more processors 102 can determine a target process by matching a text string and/or regex pattern against a command-line instruction which launched the process or a parent process thereof, and/or by matching a text string and/or regex pattern against a system image of the process or a parent thereof.

Moreover, it should be understood that volatile memory according to example embodiments of the present disclosure includes cache memory. In general, a cache memory is a component of system memory of a computer system 100. A cache memory is generally a memory implemented to have faster read and write speed than the remainder of the system memory of a computing system. A cache memory is commonly implemented as a processor cache, a memory having physical locality near one or more cores of any of a general-purpose processor or a special-purpose processor as described above with reference to FIG. 1. Thus, a processor cache may be any of a CPU cache, a GPU cache, and the like which may be implemented at a processor as known to persons skilled in the art. A processor cache may be implemented having multiple hierarchical levels, where a smallest level of a processor cache may have fastest read and write speeds among the levels and a largest level of a processor cache may have slowest read and write speeds among the levels.

A cache memory may temporarily store data copied from the system memory (which may be referred to as a "backing store" in this context) on a temporary basis to satisfy read and write requests to particular memory addresses which are likely to be made repeatedly by a cache client, such as one or more processors, computer-executable applications, an OS, and the like. Data stored at a cache memory is ultimately copied back to the backing store. According to example embodiments of the present disclosure, "volatile memory" can interchangeably refer to data stored in volatile system memory and/or cache memory of any processors.

Furthermore, a volatile memory scan can be optionally performed according to multiple types of scan parameters, including a signature, a memory type, and a memory permission.

According to a signature parameter, a volatile memory scan according to example embodiments of the present disclosure can match one or more byte sequences, string sequences, and/or regular expressions against data stored across a range of memory addresses. By way of example, byte sequences can include a sequence of hexadecimal values which can be found in data stored in volatile memory, such sequence of hexadecimal values being characteristic of a malicious attack. By way of example, string sequences can include a sequence of text which can be found in data stored in volatile memory, such as text strings forensically sampled from quarantined malware samples, names of dynamically linked libraries known to be exported during malware attacks, and/or names of memory allocation, memory encryption, and/or memory addressing commands known to be called during malware attacks. By way of example, regular expressions can include sequences of metacharacters and literal characters which identify one or more patterns of characters which appear in a sequence of characters.

A volatile memory scan is process-specific: the scan is performed upon volatile memory addresses corresponding to a virtual address space mapped for a target process, as described above, running on the computing system 100. Virtual pages in the virtual address space are mapped to ranges of addresses of physical volatile memory.

According to an optional memory type parameter, each byte sequence, string sequence, or pattern of characters matching a regex is specified to only be found within particular types of volatile memory as classified by an OS. By way of example, on computing systems running Windows operating systems from Microsoft Corporation of Redmond, Washington, virtual pages of a process can be classified as MEM_PRIVATE, MEM_IMAGE, or MEM_MAPPED. The matching of each particular byte sequence, each particular string sequence, and each regular expression can be limited to pages matching one or more of these classifications.

According to an optional memory permission parameter, each byte sequence, string sequence, or pattern of characters matching a regex is specified to only be found within memory having specific permissions set By way of example, the matching of each particular byte sequence, each particular string sequence, and each regular expression can be limited to memory having read-only permission set, can be limited to memory having executable permission set; and so on.

According to example embodiments of the present disclosure, combinations of a byte sequence, a string sequence, or regular expressions; optionally, a memory type parameter; and, optionally, a memory permission parameter can be recorded as a definition in a configuration file. Any number of such definitions can be stored in a configuration file. FIG. 4 illustrates a configuration file storing multiple definitions according to example embodiments of the present disclosure.

Moreover, according to example embodiments of the present disclosure, matching of a byte sequence, a string sequence, or a regular expression can be restricted to only a range of virtual pages originally allocated for the target process, and/or can be restricted to a range of addresses originally allocated for the target process.

According to example embodiments of the present disclosure, at any time before a volatile memory scan starts, the volatile memory scanning module 114 configures one or more processors 102 to optionally aggregate multiple memory type parameters and multiple memory permission parameters for multiple sequence parameters. For an aggregation of any number of signature parameters (i.e., different byte sequences, different string sequences, and/or different regular expressions) which are stored by the computing system 100 for potential matching in a volatile memory scan, the volatile memory scanning module 114 configures one or more processors 102 to determine the set of all possible memory type parameters and the set of all possible memory permission parameters for those aggregated byte sequences, string sequences, and/or regular expressions. Subsequently, such a set is referred to as a "type/permission aggregation," for brevity, and is used in downselecting scope of a memory acquisition process as subsequently described.

It should be understood that one or more processors 102 can be configured according to multiple, mutually exclusive type/permission aggregations, such that different aggregations are to be applied for different scan triggers; depending on the nature of different sequences of triggering events, certain aggregations may not be applicable. Thus, scope of a single volatile memory scan can be downselected by evaluating for different type/permission aggregations, as subsequently described.

Figure 3A:
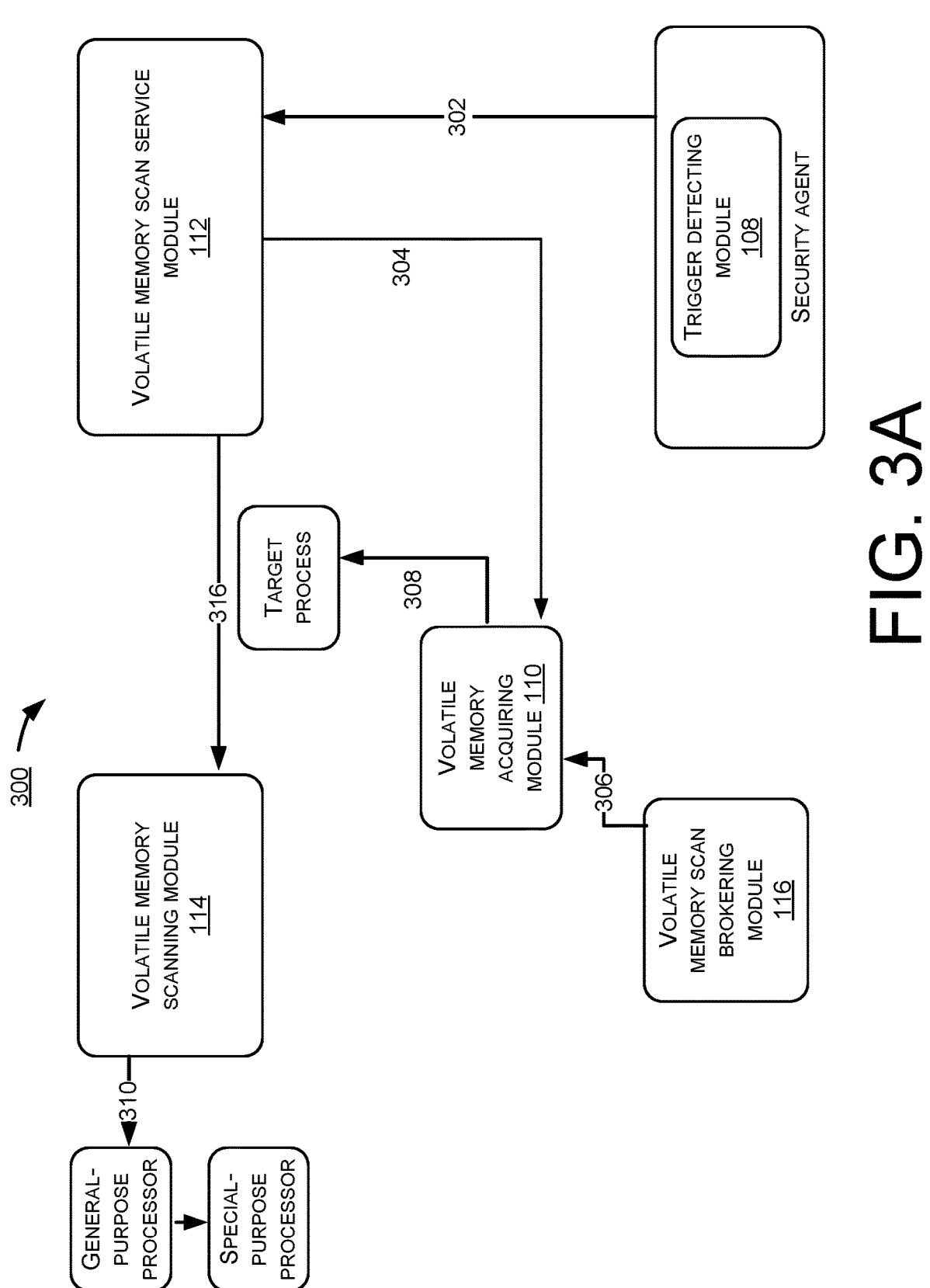
Figure 3B:
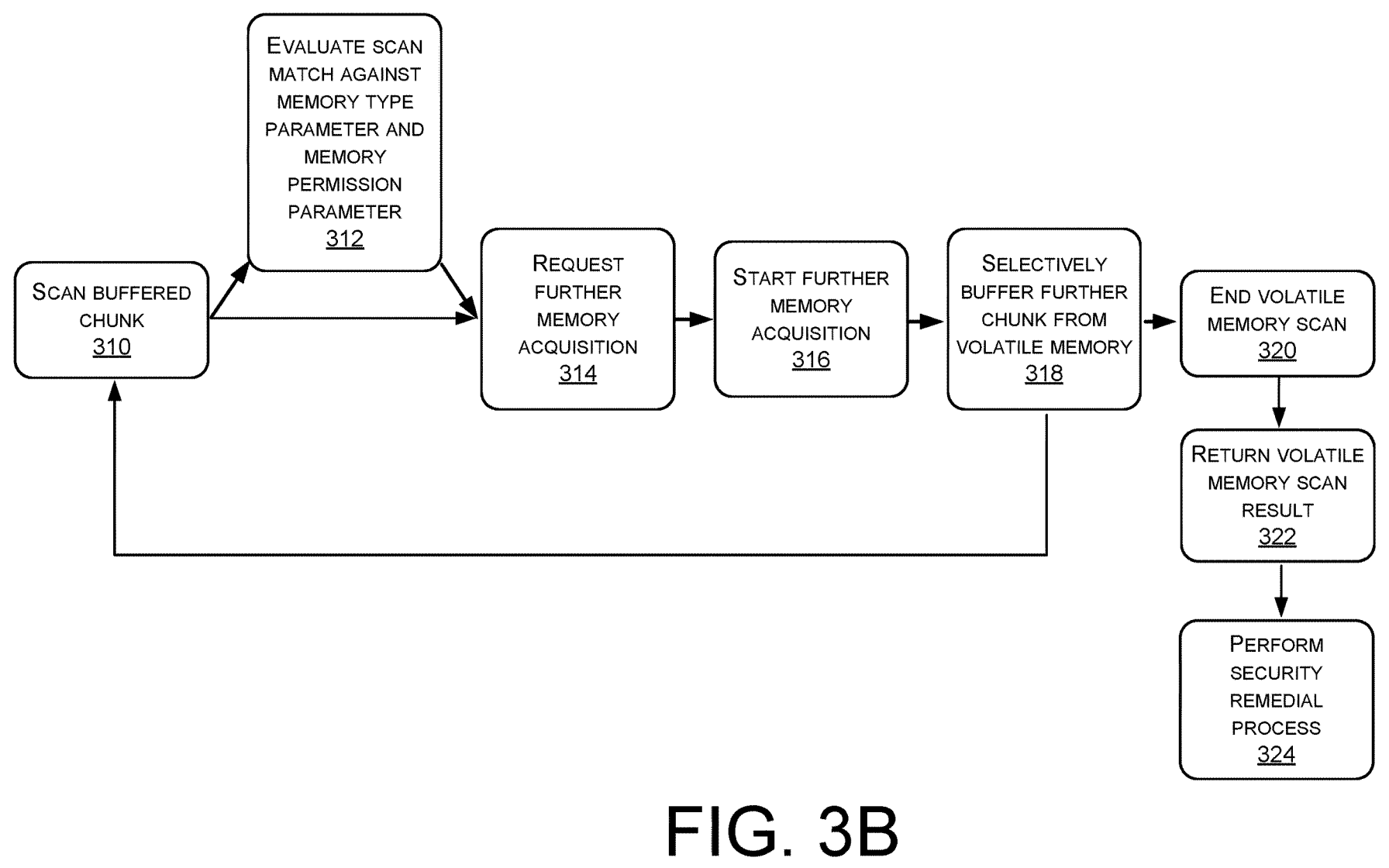
Figure 3C:
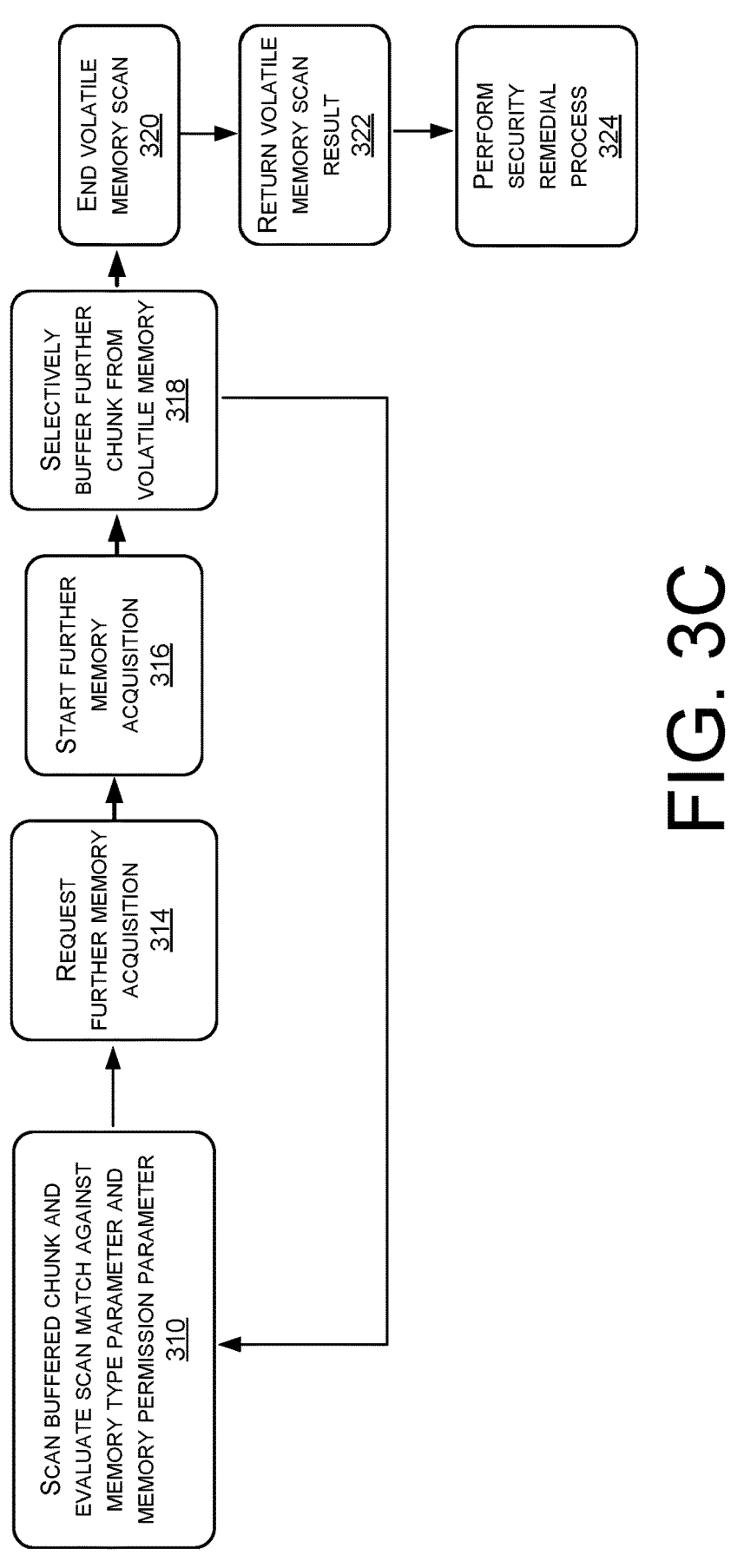

FIG. 2 illustrates a block diagram of the exchange of data between the volatile memory acquiring module 110, the volatile memory scanning module 114, and the volatile memory scan brokering module 116. FIGS. 3A, 3B, and 3C illustrate a flow diagram of a volatile memory scanning process 300 according to example embodiments of the present disclosure.

At a step 302, one or more processors of a computing system detect a volatile memory scan trigger.

One or more processes of a security agent installed on the computing system, such as a trigger detecting module 108 as described above, can configure one or more processors of a computing system to detect a sequence of triggering events making up a scan trigger by receiving notifications of execution of other computer-executable instructions (such as writes to volatile memory, executables files being launched, or flow of network traffic to remote network addresses) from host operating system hooks or filter drivers, from user-mode activity pattern monitors, or from threads monitoring log files or memory locations.

At a step 304, one or more processors of the computing system start a volatile memory scan.

The volatile memory scan is started while the target process is running, before the target process is terminated.

At a step 306, one or more processors of the computing system start a memory acquisition.

The volatile memory acquiring module 110 as described above configures one or more processors 102 to start the acquisition of a chunk corresponding to a range of the virtual address space allocated to the target process, from a system context of the target process. Each chunk can be a fixed size, and a memory acquisition can span a number of chunks, iteratively buffered as subsequently described.

At a step 308, one or more processors of the computing system selectively buffer a chunk from a system context of the target process, corresponding to a range of a virtual address space allocated to the target process.

The volatile memory acquiring module 110 configures one or more processors 102 to, by kernel-level or user-level calls to OS system services, buffer memory pages from a virtual address space allocated to the user-level target process. According to example embodiments of the present disclosure, one or more processors 102 can buffer at least part of one or more pages of memory by copying bytes of an address range of a virtual address space to a chunk buffer; by writing a pointer to an address range of a virtual address space into a chunk buffer; by creating a mapping to an address range of a virtual address space in a chunk buffer; or otherwise storing bytes of the address range, or a reference to the address range, in a chunk buffer with or without copying. By buffering chunks iteratively from volatile memory, the volatile memory scan can proceed even in the event that the target process terminates, or the target process overwrites part or all of its allocated virtual address space.

Furthermore, it should be understood that selective buffering of a chunk is performed by reference to type/permission aggregations as described above. A chunk can be buffered from a virtual page which matches a type/permission aggregation, or which does not match any type/permission aggregation. A virtual page which does not match any type/permission aggregation will not return a positive result based on an aggregation of byte sequences, string sequences, and/or regular expressions, and does not need to be buffered and subjected to the volatile memory scan.

Thus, whenever a chunk is buffered, it should be understood that the chunk matches at least one type/permission aggregation for an aggregation of byte sequences, string sequences, and/or regular expressions.

For the purpose of matching against type/permission aggregation, during scanning, the buffered chunk or a pointer, mapping, or otherwise reference thereto is recorded in a chunk buffer, the chunk buffer including multiple subbuffers; optionally, for each possible combination of memory type and memory permission, corresponding data, or a pointer, mapping, or otherwise reference thereto, is copied into a different subbuffer Each possible combination of memory type and memory permission need not be exclusively stored in one subbuffer, and multiple subbuffers can be written for the same combination of memory type and memory permission. Furthermore, a metadata buffer can be written alongside the chunk buffer, the metadata buffer storing combinations of memory types and memory permissions corresponding to each subbuffer of the metadata buffer.

The chunk buffer and the metadata buffer can each have a fixed size, where the chunk buffer has the same size as a buffered chunk or a pointer, mapping, or otherwise reference thereto, and the metadata buffer has the maximum size required to describe memory types and memory permissions over the size of the buffered chunk. Each buffered chunk is recorded in the same chunk buffer, overwriting any previous data therein.

The buffering of a chunk can be performed by the following steps, in summary, which can be performed in any number of iterations:

One or more processors 102 determine memory types and memory permissions across a chunk;

One or more processors 102 determine that the chunk matches against type/permission aggregations;

One or more processors 102 buffer a chunk to a chunk buffer;

One or more processors 102 copy metadata of the chunk to a metadata buffer;

One or more processors 102 identify a starting address of a subsequent iterative chunk, based on incrementing a starting address of the iterative chunk by a size of the iterative chunk.

At a step 310, one or more processors of the computing system scan the buffered chunk for a match against a byte sequence, a string sequence, or a regular expression, and optionally evaluates a scan match against a memory type parameter and a memory permission parameter.

The volatile memory scanning module 114 configures one or more processors 102 to match one or more sets of byte sequences, string sequences, or regular expressions (such as, by way of example, as described above) against data stored in the buffered chunk. As illustrated in FIG. 3B, this matching does not consider any memory type parameters and does not consider any memory permission parameters, but can be followed by subsequent matching against memory type parameters and memory permission parameters in step 312 so as to downselect scope of the scan, as described subsequently. As illustrated in FIG. 3C, step 310 further includes evaluating a scan match against a memory type parameter and a memory permission parameter so as to downselect scope of the scan; this matching is substantially similar to step 312 as described subsequently, except that, in step 310, this matching can be performed by special-purpose processors as described subsequently. Each set of byte sequences, string sequences, and regular expressions to be matched is stored by the volatile memory scanning module 114.

By way of example, one or more processors 102 can be configured to match any one signature among multiple byte sequences, string sequences, and/or regular expressions.

By way of another example, one or more processors 102 can be configured to match each signature among multiple byte sequences, string sequences, and/or regular expressions.

It should be understood that one or more processors 102 which scan the buffered chunk, and one or more processors 102 which evaluate a scan match against a memory type parameter and a memory permission parameter, can include one or more general-purpose processors and can include one or more special-purpose processors. By way of example, special-purpose processors configured to scan the buffered chunk, and to evaluate a scan match against a memory type parameter and a memory permission parameter, can include a system on a chip ("SoC") or a GPU integrated into a general-purpose processor, and the general-purpose processor can offload the scan and the evaluation to the integrated SoC or GPU.

By way of another example, in computing systems 100 wherein general-purpose processors do not include integrated special-purpose processors, a general-purpose processor can perform the scan and can perform the evaluation in multiple threads. Furthermore, size of a chunk buffer can be reduced, in order to reduce computational cost.

It should be understood that, during a single scan, one or more processors 102 matches against any number of mutually exclusive sets of aggregated byte sequences, string sequences, and/or regular expressions. This avoids incurring excess computational performance penalties by scanning the same memory addresses more than once. Each set of aggregated byte sequences, string sequences, and/or regular expressions can be written to a separate record in a data structure, such as an array, so that each set can be handled distinctly in subsequent steps such as evaluation of a scan match.

Furthermore, prior to starting any scans, the volatile memory scanning module 114 configures one or more processors 102 to remove any duplicate byte sequences, any duplicate string sequences, and any duplicate regular expressions from the sets of aggregate byte sequences, string sequences, and/or regular expressions.

At a step 312, one or more processors of the computing system evaluate a scan match against a memory type parameter and a memory permission parameter.

In the event that the scan matches against a byte sequence, a string sequence, or a pattern of characters matching a regex, one or more processors 102 further verify whether a virtual page wherein the scan matched also matches against a corresponding memory type parameter of the matching byte sequence, string sequence, or pattern of characters matching a regex, and also matches against a corresponding permission type parameter of the matching byte sequence, string sequence, or pattern of characters matching a regex. Failure to match against a corresponding memory type parameter and a corresponding permission type parameter causes the byte match or string match to be rejected as a positive result of a volatile memory scan, thereby downselecting scope of the scan.

Evaluation of a scan match can be performed for type/permission aggregations. Given that a scan matches against all byte sequences, string sequences, and/or regular expressions aggregated for a type/permission aggregation, that scan must also match against all types and permissions aggregated. As described above, each set of aggregated byte sequences, string sequences, and/or regular expressions can be written to a separate record in a data structure, so that each set, and each type/permission aggregation corresponding to that set, can be handled distinctly.

At a step 314, one or more processors of the computing system request a further memory acquisition.

In the event that a scan match evaluates as a positive result but scan matches against other byte sequences, string sequences, and/or patterns of characters matching a regex are needed to identify a malicious attack, or in the event that no scan matches are found, further memory acquisitions may be required to determine whether a malicious attack is occurring. Therefore, the volatile memory scanning module 114, configures one or more processors to start a further memory acquisition.

At a step 316, one or more processors of the computing system start a further memory acquisition.

The volatile memory scan service module 112 configures one or more processors to start a further memory acquisition.

At a step 318, one or more processors of the computing system selectively buffer a further chunk from volatile memory.

As described above, the volatile memory acquiring module 110 configures one or more processors 102 to buffer pages from a virtual address space allocated to the target process.

At a step 320, one or more processors of the computing system end a volatile memory scan.

At a step 322, one or more processors of the computing system return a volatile memory scan result.

For example, a volatile memory scanning module 114 can configure one or more processors 102 to return a positive volatile memory scan result in the event that a sufficient number of byte sequences, string sequences, and/or patterns of characters matching a regex, or combinations thereof, are positively matched to positively identify a malicious attack. A volatile memory scanning module 114 can configure one or more processors 102 to return a negative volatile memory scan result in the event that an insufficient number of byte sequences, string sequences, and/or patterns of characters matching a regex, or combinations thereof, are positively matched.

At a step 324, one or more processors of the computing system perform a security remedial process at the computing system.

As described above, kernel-level or user-level processes of security agents can further enact security remedial processes at the computing system, as appropriate depending on the result of the volatile memory scan.

Thus, example embodiments of the present disclosure provide computing systems configured to trigger a volatile memory scan based on execution of computer-executable instructions, and to downselect scope of a volatile memory scan. Such techniques for triggering scans are sufficiently selective to avoid volatile memory scans for each and every running process, or vast majority of running processes. Moreover, volatile memory scan responsively after the computer-executable instructions are run, so that target processes to be scanned have not yet terminated at the time of the volatile memory scan. Additionally, a variety of techniques are implemented to minimize the volatile memory scans adversely impacting computational performance of the computing system.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   detecting a volatile memory scan trigger comprising a sequence of triggering events;
   iteratively buffering a plurality of chunks from a system context of a target process, wherein the plurality of chunks exclude a type of volatile memory where a signature parameter cannot be found and a memory permission setting where the signature parameter cannot be found; and
   scanning a buffered chunk for a match against the signature parameter.

2. The method of claim 1, further comprising evaluating a scan match against at least one of a memory type parameter and a memory permission parameter.

3. The method of claim 1, wherein the sequence of triggering events comprises loading computer-executable instructions into volatile memory addresses and executing the computer-executable instructions from volatile memory in the target process.

4. The method of claim 1, wherein the chunk matches at least one type/permission aggregation for an aggregation of signature parameters.

5. The method of claim 1, wherein, for each combination of memory type and memory permission, corresponding data of the chunk is buffered into a different subbuffer of a chunk buffer comprising a plurality of subbuffers.

6. The method of claim 1, wherein scanning the buffered chunk comprises scanning the buffered chunk for a match against one or more of a plurality of sets of byte sequences, string sequences, or regular expressions against data stored in the buffered chunk.

7. The method of claim 1, wherein evaluating a scan match comprises determining whether a virtual page wherein the scan matched against a byte sequence, string sequence, or regular expression further matches against a corresponding memory type parameter of the matching byte sequence, string sequence, or regular expression, and further matches against a corresponding permission type parameter of the matching byte sequence, string sequence, or regular expression.

15

16

8. A system comprising:

one or more processors; and memory communicatively coupled to the one or more processors, the memory storing computer-executable modules executable by the one or more processors that, when executed by the one or more processors, perform associated operations, the computer-executable modules comprising:

a trigger detecting module executable by the one or more processors to detect a volatile memory scan trigger comprising a sequence of triggering events;

a volatile memory acquiring module executable by the one or more processors to iteratively buffer a plurality of chunks from a system context of a target process, wherein the plurality of chunks exclude a type of volatile memory where a signature parameter cannot be found and a memory permission setting where the signature parameter cannot be found; and a volatile memory scanning module executable by the one or more processors to scan a buffered chunk for a match against the signature parameter.

9. The system of claim 8, wherein the volatile memory scanning module is further executable to evaluate a scan match against at least one of a memory type parameter and a memory permission parameter.

10. The system of claim 8, wherein the sequence of triggering events comprise loading computer-executable instructions into volatile memory addresses and executing the computer-executable instructions from volatile memory in the target process.

11. The system of claim 8, wherein the chunk matches at least one type/permission aggregation for an aggregation of signature parameters.

12. The system of claim 8, wherein, for each combination of memory type and memory permission, corresponding data of the chunk is buffered into a different subbuffer of a chunk buffer comprising a plurality of subbuffers.

13. The system of claim 8, wherein scanning the buffered chunk comprises scanning the buffered chunk for a match against one or more of a plurality of sets of byte sequences, string sequences, or regular expressions against data stored in the buffered chunk.

14. The system of claim 8, wherein evaluating a scan match comprises determining whether a virtual page wherein the scan matched against a byte sequence, string sequence, or regular expression further matches against a corresponding memory type parameter of the matching byte sequence, string sequence, or regular expression, and further matches against a corresponding permission type parameter of the matching byte sequence, string sequence, or regular expression.

15. A computer-readable storage medium storing computer-readable instructions executable by one or more processors, that when executed by the one or more processors, cause the one or more processors to perform operations comprising:

detecting a volatile memory scan trigger comprising a sequence of triggering events;

iteratively buffering a plurality of chunks from a system context of a target process, wherein the plurality of chunks exclude a type of volatile memory where a signature parameter cannot be found and a memory permission setting where the signature parameter cannot be found; and scanning a buffered chunk for a match against the signature parameter.

16. The computer-executable storage medium of claim 15, wherein the operations further comprise evaluating a scan match against at least one of a memory type parameter and a memory permission parameter.

17. The computer-executable storage medium of claim 15, wherein the sequence of triggering events comprise loading computer-executable instructions into volatile memory addresses and executing the computer-executable instructions from volatile memory in the target process.

18. The computer-executable storage medium of claim 15, wherein the chunk matches at least one type/permission aggregation for an aggregation of signature parameters.

19. The computer-executable storage medium of claim 15, wherein, for each combination of memory type and memory permission, corresponding data of the chunk is buffered into a different subbuffer of a chunk buffer comprising a plurality of subbuffers.

20. The computer-executable storage medium of claim 15, wherein scanning the buffered chunk comprises scanning the buffered chunk for a match against one or more of a plurality of sets of byte sequences, string sequences, or regular expressions against data stored in the buffered chunk.

* * * * *